United States Patent
Goldring

(10) Patent No.: US 8,380,913 B2
(45) Date of Patent: Feb. 19, 2013

(54) DATA DIODE

(75) Inventor: Bernard Albert Goldring, Christchurch (GB)

(73) Assignee: BAE Systems PLC, London (GB)

( * ) Notice: Subject to any disclaimer, the term of this patent is extended or adjusted under 35 U.S.C. 154(b) by 300 days.

(21) Appl. No.: 12/682,349

(22) PCT Filed: Oct. 7, 2008

(86) PCT No.: PCT/GB2008/050914
§ 371 (c)(1),
(2), (4) Date: Apr. 9, 2010

(87) PCT Pub. No.: WO2009/047556
PCT Pub. Date: Apr. 16, 2009

(65) Prior Publication Data
US 2010/0235561 A1 Sep. 16, 2010

(30) Foreign Application Priority Data

Oct. 10, 2007 (EP) ..................................... 07270058
Oct. 10, 2007 (GB) ................................... 0719725.4

(51) Int. Cl.
*G06F 13/36* (2006.01)
(52) U.S. Cl. ........................................ 710/315; 710/305
(58) Field of Classification Search .................. 710/315, 710/305–306, 100
See application file for complete search history.

(56) References Cited

U.S. PATENT DOCUMENTS

2005/0033990 A1 2/2005 Harvey et al.
2005/0262285 A1 11/2005 Kang
2006/0265540 A1 11/2006 Mass et al.

FOREIGN PATENT DOCUMENTS

| EP | 1 598 743 A2 | 11/2005 |
| EP | 1 631 914 A2 | 3/2006 |
| KR | 2006/0042576 A | 5/2006 |
| WO | WO 2004/105297 A2 | 12/2004 |

OTHER PUBLICATIONS

Stevens et al. "Data Diodes", Australian Government Department of Defense Publications online, Jul. 1995, pp. i-viii and 1-12, XP-002469791.*
Ana Luiza De Almeida Pererra Zuquim et al. "An Embedded Converter From RS232 to Universal Serial Bus", Integrated Circuits and Systems Design, Sep. 10-15, 2001, pp. 91-96, XP-010558874.*
International Search Report of Application PCT/GB2008/050914 dated Dec. 19, 2008.

(Continued)

*Primary Examiner* — Brian Misiura
*Assistant Examiner* — Kim Huynh
(74) *Attorney, Agent, or Firm* — Buchanan Ingersoll & Rooney PC

(57) ABSTRACT

A data diode comprises a USB input port coupled to a first USB to RS422 converter, which is coupled to a first serial port. A second serial port is coupled to a second USB to RS422 converter, which is coupled to a USB output port. The TX-pin of the first serial port is connected to the RX-pin of the second serial port and the TX+ pin of the first serial port is connected to the RX+ pin of the second serial port. The TX ports of the second serial port are not connected to the RX ports of the first serial port, thereby preventing reverse data flow.

20 Claims, 3 Drawing Sheets

OTHER PUBLICATIONS

Written Opinion of the International Searching Authority of Application PCT/GB2008/050914 dated Dec. 19, 2008.
United Kingdom Search Report of Application GB 0719725.4 dated Mar. 5, 2008.
European Search Report of Application EP 07270058.6 dated Mar. 5, 2008.
M. Stevens et al., "Data Diodes", Australian Government Department of Defense Publications online, Jul. 1995, pp. i-viii and 1-12, XP-002469791.
Ana Luiza De Almeida Pereira Zuquim et al., "An Embedded Converter From RS232 to Universal Serial Bus", Integrated Circuits and Systems Design, Sep. 10-15, 2001, pp. 91-96, XP-010558874.
Notification Concerning Transmittal of International Preliminary Report on Patentability (Forms PCT/IB/326 and PCT/IB/373) and the Written Opinion of the International Searching Authority (Form PCT/ISA/237) issued in corresponding International Application No. PCT/GB2008/050914 dated Apr. 22, 2010.

* cited by examiner

DATA DIODE

The invention relates to a data diode.

It is often necessary to provide a one-way path for data from, typically, a lower security classification system to a higher security classification system, without allowing any signal return path, which could compromise the security of the higher security classification system. A serial data diode is known for universal asynchronous receiver transmitter (UART) serial ports operating in the RS232 voltage signalling standard. However, the universal serial bus (USB) has largely replaced the standard serial port as the preferred means for connecting devices to a PC because it is simpler, easier to use, and offers faster data transmission rates (the maximum data rate for the RS232 standard is 115.2 Kb/s, where as USB can transmit data at up to 480 Mbit/s). While USB ports offer a fast data transmission rates, they suffer from being bidirectional (half-duplex) and are therefore unsuitable for use when data is being sent from a lower security classification system to a higher security classification system.

According to an aspect of the present invention there is provided a data diode comprising:

a USB data input port;

a first serial data port comprising a positive signal transmit pin and a negative signal transmit pin;

USB to UART signal conversion means communicatively coupled between the USB data input port and the first serial data port and operable to convert an input USB data signal into a serial data signal in a desired serial data standard; and a second serial data port comprising a positive signal receive pin and a negative signal receive pin, the positive signal transmit pin being coupled to the positive signal receive pin and the negative signal transmit pin being coupled to the negative signal receive pin, such that there is no return signal path from the second serial data port to the first serial data port.

The serial data port pins may be electrically coupled or may be optically coupled.

The USB data diode may further comprise a data diode housing in which the USB data input port, the first and second serial data ports, and the USB to UART signal conversion means are provided, the first and second serial data ports being provided within the housing in a locally spaced relationship.

Alternatively, the USB data diode may further comprise a data diode input housing and a data diode output housing, the USB data input port, USB to UART conversion means and first serial data port being provided within the input housing and the second serial data port being provided within the output housing. The USB data diode preferably further comprises coupling cable extending between the input housing and the output housing and adapted to couple the serial data port pins.

The USB data diode preferably further comprises a USB data output port and second USB to UART signal conversion means communicatively coupled between the second serial data port and the USB data output port and operable to convert an input serial data signal into a USB data signal. The USB data output port and the second USB to UART signal conversion means are preferably provided in the data diode housing or the data diode output housing.

The USB data diode may alternatively further comprise a peripheral component interconnect serial computer bus integrated circuit communicatively coupled to the second serial data port.

The or each USB to UART signal conversion means preferably comprises a USB to UART converter integrated circuit. The or each USB to UART signal conversion means preferably further comprises programmable memory means, most preferably an electrically erasable programmable read only memory device. The or each USB to UART signal conversion means preferably comprises USB to RS422 or RS485 signal conversion means.

Embodiments of the invention will now be described in detail, by way of example only, with reference to the accompanying drawings, in which.

Figure 1:
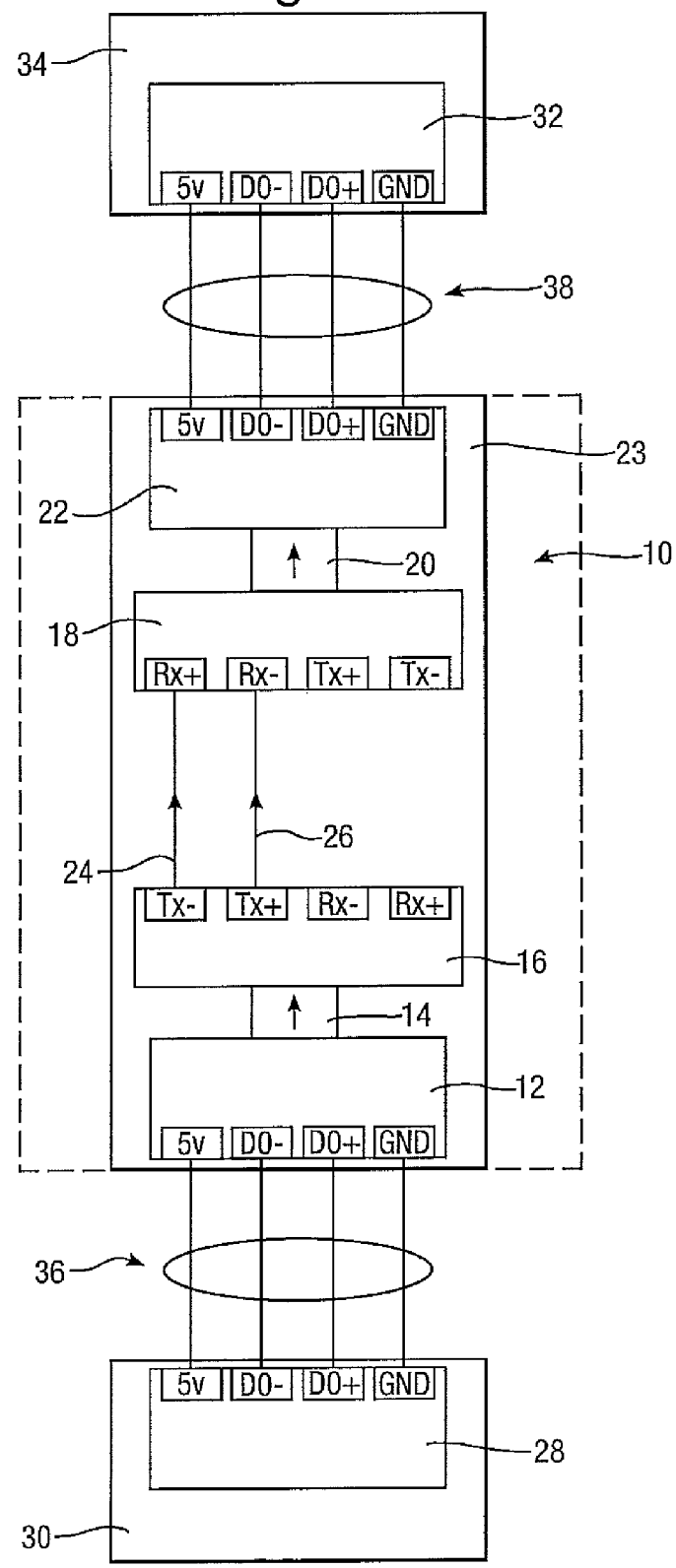
FIG. 1 is a schematic representation of a USB to USB data diode according to a first embodiment of the invention, shown connected between two external USB ports.

Referring to FIG. 1, a first embodiment of the invention comprises a data diode 10 comprising a USB input port 12, a first USB to UART conversion means 14, a first serial port 16, a second serial port 18, a second USB to UART conversion means 20, a USB output port 22, and a diode housing 23.

The pins of the USB input port 12 are communicatively coupled to the input of the first USB to UART conversion means 14. The first USB to UART conversion means 14 comprises a USB to RS422 converter having integrated memory, such as the Future Technology Devices International FT232R USB UART IC with integrated EEPROM. The USB to RS422 converter 14 is operable to convert a USB input signal into an RS422 output signal. The USB to RS422 converter 14 is provided with computer software embodied within the memory, the converter 14 being operable to run the software to control the flow of data through the diode 10. The design and operation of USB to UART converters is well known and so will not be discussed in any more detail here.

In this example, the first and second serial ports 16, 18 comprise standard serial ports having TX−, TX+, RX− and RX+ pins. The output of the first USB to RS422 converter 14 is communicatively coupled to the TX− and TX+ pins of the first serial port 16. The TX− pin of the first serial port 16 is connected to the RX− pin of the second serial port 18 by means of a first electrical cable 24 and the TX+ pin of the first serial port 16 is connected to the RX+ pin of the second serial port 18 by a second electrical cable 26. The TX ports of the second serial port 18 are not connected to the RX ports of the first serial port 16, thereby preventing data flow from the second serial port 18 to the first serial port 16.

The RX− and RX+ pins of the second serial port 18 are communicatively coupled to the input of the second USB to UART conversion means 20, which similarly comprises a USB to RS422 converter. The second USB to RS422 converter 14 is operable to convert an input RS422 data signal into a USB data signal.

The output of the second USB to RS422 converter 20 is communicatively coupled to the pins of the USB output port 22.

The USB input port 12, first USB to RS422 converter 14, serial ports 16, 18, second USB to RS422 converter 20, USB output port 22, and cables 24, 26 are provided within a diode housing 23.

In use, the data diode 10 is coupled between the USB port 28 of a low security level processor board/computer 30 and the USB port 32 of a higher security level processor board/ computer 34, using standard USB connector cables 36, 38. Data can therefore be safely transferred from the low security level computer 30 to the higher security level computer 34 without any return signal path being available, thereby preventing the low security computer 30 from obtaining data from the higher security level computer 34.

Figure 2:
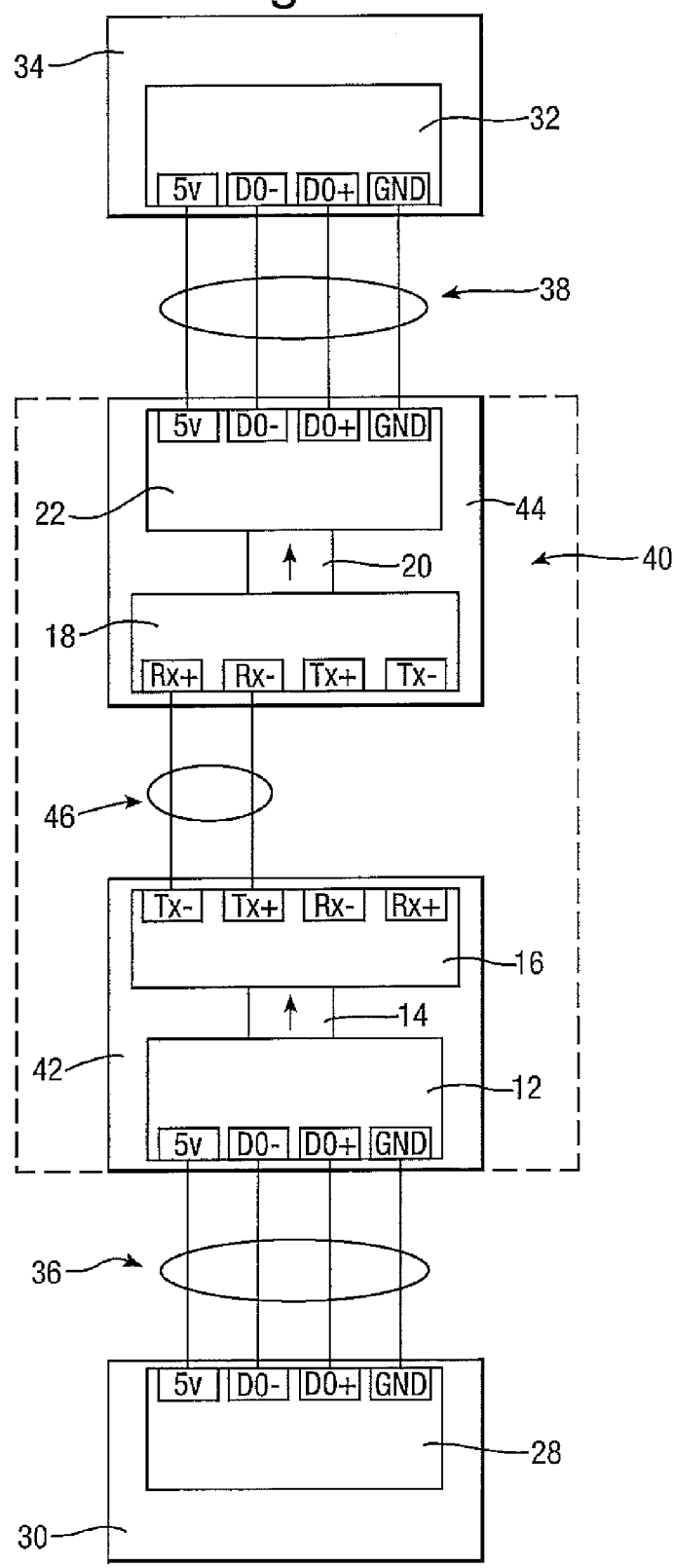
FIG. 2 is a schematic representation of a USB to USB data diode according to a second embodiment of the invention, shown connected between two external USB ports.

A data diode 40 according to a second embodiment of the invention is shown in FIG. 2. The data diode 40 of this embodiment is substantially the same as the data diode 10 of the first embodiment, with the following modifications. The same reference numbers are retained for corresponding features.

In this embodiment, the USB input port 12, first USB to RS422 converter 14, and first serial port 16 are provided within a data diode input housing 42, and the second serial port 18, second USB to RS422 converter 20, and USB output port 22 are provided within a data diode output housing 44. The TX− pin of the first serial port 16 is connected to the RX− pin of the second serial port 18 and the TX+ pin of the first serial port 16 is connected to the RX+ pin of the second serial port 18 by means of a serial cable 46.

Figure 3:
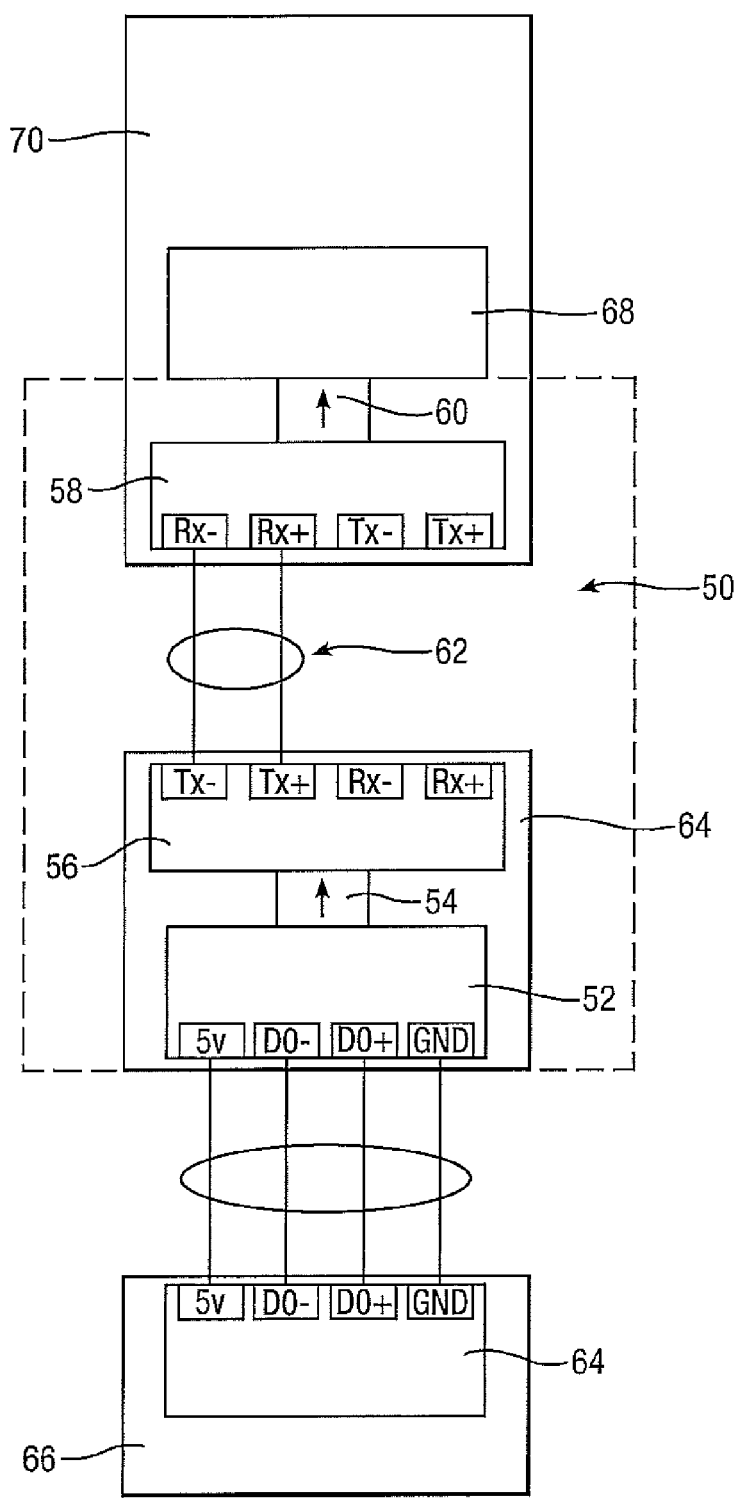
FIG. 3 is a schematic representation of a USB to RS485 serial data diode according to a third embodiment of the invention, shown connected between an external USB port and a PC processor board.

A data diode 50 according to a third embodiment of the invention is shown in FIG. 3. The data diode 50 comprises a USB input port 52, a USB to UART converter 54, a first serial port 56, a second serial port 58, an RS422 peripheral component interconnect (PCI) serial card 60, a serial cable 62 and a data diode input housing 64.

The pins of the USB input port 52 are communicatively coupled to the input of the USB to UART converter 54, which in this example comprises a USB to RS422 converter having integrated memory. The USB to RS422 converter 54 is operable to convert a USB input signal into an RS422 output signal. The USB to RS422 converter 54 is provided with computer software embodied within the memory, the converter 54 being operable to run the software to control the flow of data through the diode 50.

The first and second serial ports 56, 58 comprise standard serial ports having TX−, TX+, RX− and RX+ pins. The TX− pin of the first serial port 56 is connected to the RX− pin of the second serial port 58 and the TX+ pin of the first serial port 56 is connected to the RX+ pin of the second serial port 58 by means of a serial cable 62. The TX ports of the second serial port 58 are not connected to the RX ports of the first serial port 56, thereby preventing data flow from the second serial port 58 to the first serial port 56. The RX− and RX+ pins of the second serial port 58 are communicatively coupled to the inputs of the PCI serial card 60.

The USB input port 52, USB to RS422 converter 54, and first serial port 16 are provided in the data diode input housing 64.

In use, the data diode 50 is coupled between the USB port 64 of a low security level processor board/computer 66 and the PCI connector 68 of a higher security level processor board/computer 70.

The conversion of data signals from USB to serial and the utilisation of the pin design of serial ports to create a simplex communication path between the two serial ports 56, 58, means that the USB to serial data diode 50 provides a secure USB to serial adapter connection between a low security level system and a higher security level system. It will be appreciated that the data diodes may be used with any type of USB port.

Various modifications may be made to the described embodiments without departing from the scope of the invention. For example, a different voltage signalling standard may be used for the serial data signals, such as RS485. Consequently, a different USB to UART converter may be used. The wired connection between the two serial ports may be replaced by an optical signal connection, which may be a free space connection where the components are provided within a single data diode housing, or a cabled optical connection where an input data diode housing and an output data diode housing are provided.

The invention claimed is:

1. A data diode comprising:
    a USB data input port;
    a first serial data port comprising a positive signal transmit pin and a negative signal transmit pin;
    USB to UART signal conversion means communicatively coupled between the USB data input port and the first serial data port and operable to convert an input USB data signal into a serial data signal in a desired serial data standard; and
    a second serial data port comprising a positive signal receive pin and a negative signal receive pin, the positive signal transmit pin being coupled to the positive signal receive pin and the negative signal transmit pin being coupled to the negative signal receive pin, such that there is no return signal path from the second serial data port to the first serial data port.

2. A data diode as claimed in claim 1, wherein the serial data port pins are electrically coupled or are optically coupled.

3. A data diode as claimed in claim 1, wherein the USB data diode further comprises a data diode housing in which the USB data input port, the first and second serial data ports, and the USB to UART signal conversion means are provided, the first and second serial data ports being provided within the housing in a locally spaced relationship.

4. A data diode as claimed in claim 1, wherein the USB data diode further comprises a data diode input housing and a data diode output housing, the USB data input port, USB to UART conversion means and first serial data port being provided within the input housing and the second serial data port being provided within the output housing.

5. A data diode as claimed in claim 1, wherein the USB data diode further comprises a USB data output port and second USB to UART signal conversion means communicatively coupled between the second serial data port and the USB data output port and operable to convert an input serial data signal into a USB data signal.

6. A data diode as claimed in claim 1, wherein the USB data diode further comprises a peripheral component interconnect serial computer bus integrated circuit communicatively coupled to the second serial data port.

7. A data diode as claimed in claim 1, wherein the USB to UART signal conversion means comprises a USB to UART converter integrated circuit.

8. A data diode as claimed in claim 7, wherein the USB to UART signal conversion means further comprises programmable memory means.

9. A data diode as claimed in claim 1, wherein the USB to UART signal conversion means comprises USB to RS422 or RS485 signal conversion means.

10. A data diode as claimed in claim 2, wherein the serial data port pins are electrically coupled or are optically coupled.

11. A data diode as claimed in claim 2, wherein the USB data diode further comprises a data diode housing in which the USB data input port, the first and second serial data ports, and the USB to UART signal conversion means are provided, the first and second serial data ports being provided within the housing in a locally spaced relationship.

12. A data diode as claimed in claim 2, wherein the USB data diode further comprises a data diode input housing and a data diode output housing, the USB data input port, USB to UART conversion means and first serial data port being provided within the input housing and the second serial data port being provided within the output housing.

13. A data diode as claimed in claim 2, wherein the USB data diode further comprises a USB data output port and second USB to UART signal conversion means communicatively coupled between the second serial data port and the USB data output port and operable to convert an input serial data signal into a USB data signal.

14. A data diode as claimed in claim 3, wherein the USB data diode further comprises a USB data output port and second USB to UART signal conversion means communicatively coupled between the second serial data port and the USB data output port and operable to convert an input serial data signal into a USB data signal.

15. A data diode as claimed in claim 4, wherein the USB data diode further comprises a USB data output port and second USB to UART signal conversion means communicatively coupled between the second serial data port and the USB data output port and operable to convert an input serial data signal into a USB data signal.

16. A data diode as claimed in claim 2, wherein the USB data diode further comprises a peripheral component interconnect serial computer bus integrated circuit communicatively coupled to the second serial data port.

17. A data diode as claimed in claim 3, wherein the USB data diode further comprises a peripheral component interconnect serial computer bus integrated circuit communicatively coupled to the second serial data port.

18. A data diode as claimed in claim 4, wherein the USB data diode further comprises a peripheral component interconnect serial computer bus integrated circuit communicatively coupled to the second serial data port.

19. A data diode as claimed in claim 2, wherein the USB to UART signal conversion means comprises a USB to UART converter integrated circuit.

20. A data diode as claimed in claim 3, wherein the USB to UART signal conversion means comprises a USB to UART converter integrated circuit.

\* \* \* \* \*